United States Patent Office 3,186,681
Patented June 1, 1965

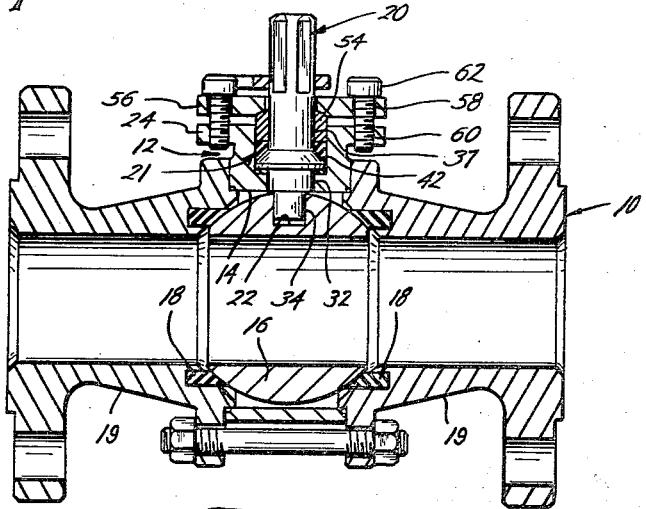
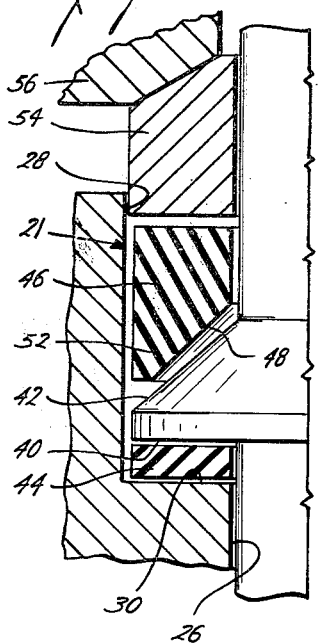
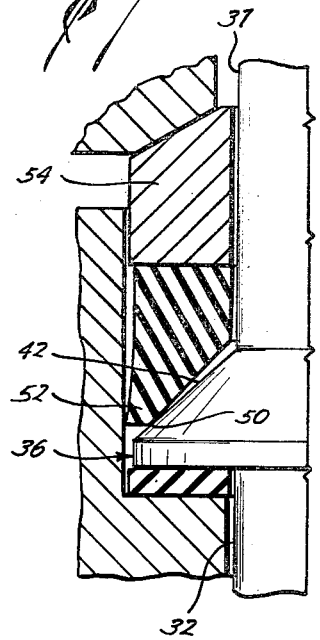
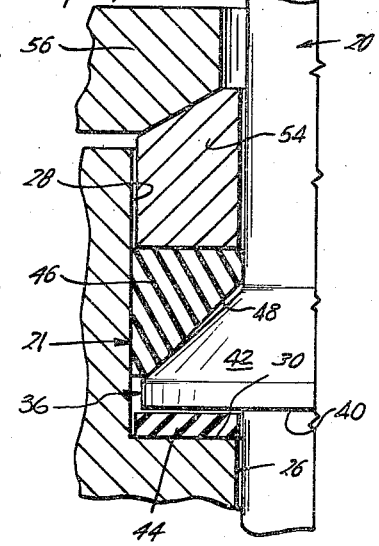
William E. Lowrey
INVENTOR.

3,186,681
STEM SEAL FOR ROTARY PLUG VALVE
William E. Lowrey, Houston, Tex., assignor to ACF Industries, Incorporated, New York, N.Y., a corporation of New Jersey
Filed Dec. 18, 1961, Ser. No. 160,703
5 Claims. (Cl. 251—214)

This invention relates to a stem seal for rotary plug valves and more particularly to a stem seal for spherical plug valves or ball valves as they are more commonly known.

Ball valves, unlike tapered plug valves and cylindrical plug valves, quite frequently have a separate valve stem which, in many instances, is inserted through an opening from the exterior of the valve housing. Means are provided to prohibit the axial outward movement of such stem. It is necessary to provide a seal between the stem and the wall of the opening to prevent the escape of the lading passing through the valve. While the sealing function is a prime requisite for any stem seal, it is also desirable that the torque resulting from the seal load is kept to a minimum to prevent hard turning of the valve. Moreover, if the valve is automated high torque may require a larger size operator.

One common means of effecting a seal between a stem and the opening through which the stem extends is to place packing around the stem and compress the packing until it effects a seal with the wall of the opening and the stem. However, this is a compression type seal and will tend to bind the stem and increase the torque necessary to turn the stem. One of the main objects of the present invention is to provide a stem seal which will not bind the stem and will tend to keep the turning torque requirements at a minimum.

In order to achieve low torques, the stem seal of the present invention utilizes a seal member formed of a resilient plastic material having a low coefficient of friction, is pressure acting, and requires a minimum of axial loading to effect a seal. The stem is provided with a shoulder having a frusto conical axial outer surface and a flat axial inner surface. A flat resilient washer is placed under the flat surface and acts as a thrust washer. An annular resilient seal member having a tapered end surface opposes the frusto conical surface of the shoulder. The angle of the tapered surface of the seal member is slightly greater than the angle of the frusto conical surface thereby initial contact is made at the outer edge. By applying an axial load, the edge of the seal member contacting the frusto conical surface effects a seal with the stem. Since the edge is a thin section, the seal member will easily wipe against the wall of the opening to effect a seal with the wall of the opening. Accordingly, a seal will be effected between the wall of the opening and the stem upon a minimum application of axial load. In addition to the slight compression type seal effected by the axial load, there will be a pressure acting seal effected by the pressure of the lading acting on the stem. Since the seal is at the outer edge of the frusto conical shoulder, the largest differential stem area results to facilitate pressure sealing. Instead of a compressive load of sufficient magnitude to seal under all conditions, a minimum compression type seal is used and thereafter a pressure actuated seal in response to pressure in the valve is present. Therefore, there will be no excessive binding of the stem at low pressure just to take care of higher pressure. Accordingly, it is another object of this invention to provide a novel pressure actuated stem seal.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a sectional view of a ball valve incorporating the stem seal of the present invention.

FIG. 2 is an enlarged fragmentary sectional view showing the relationship of the parts prior to applying load to the seal ring.

FIG. 3 is an enlarged fragmentary sectional view showing relationship of parts after application of initial axial load.

FIG. 4 is a view similar to FIG. 3 showing relationship of parts when the valve is under pressure.

Referring now to the drawings, the improved stem seal of the present invention is shown incorporated in a ball valve 10 similar in many respects to that fully disclosed in my copending application Ser. No. 153,481, filed November 20, 1961. Generally speaking, there is a valve housing 12 having a valve chamber 14 in which is located a spherical valve member 16. Seats 18—18 located in end members 19—19 provide seals controlling the flow through the valve. Rotation of the spherical valve member 16 is effected by a separate stem 20 which extends through an opening 21 in the valve housing 12. The inner end of the stem 20 is co-operatively engaged with a slot 22 in the valve member 16. The present invention is directed to the seal between stem 20 and the opening 21 through which the stem extends.

As can be seen, the housing 12 is provided with a boss 24 having the opening 21 formed of a small aperture 26 and a large aperture 28 with a shoulder or stem thrust support surface 30 at the intersection of the two apertures. The stem 20 has a cylindrical inner end 32 which extends through the small aperture 26 and terminates in a tongue 34 which is co-operatively engaged with the slot 22 in the valve member 16. Axially exterior of the cylindrical portion 32 is an annular shoulder 36 which is located in the large aperture 28. Extending axially outward from the shoulder is an outer cylindrical portion 37 which extends past the top of the boss 24. It is around the annular shoulder 36 that the stem seal of the present invention is effected.

The annular shoulder 36 has a flat axial inner surface 40 and a frusto conical axial outer surface 42. A flat resilient washer 44 is positioned around the inner cylindrical portion 32 between the shoulder 30 and the flat surface 40 of the shoulder 36. The washer 44 acts as a thrust member for the stem 20. An annular resilient seal member 46 is positioned around the outer cylindrical portion 38 of the stem 20. The thrust washer 44 and seal member 46 are preferably formed of a resilient plastic material having a low coefficient of friction. It has been found that tetrafluoroethylene, commercially available under the trademark "Teflon" makes an excellent material. In addition to its low coefficient of friction, it is inert to most ladings and has acceptable temperature limitations. For higher pressure applications, various fillers may be incorporated in the Teflon as is well known in the art.

The seal member 46 has a tapered surface 48 opposing the frusto conical surface 42 of the shoulder 36. The angle of the tapered surface 48 is slightly greater than the angle of the frusto conical surface 42, see FIG. 1. The two mating parts were so designed that the angle of the surface 48 will always be at least 1° greater than the angle of the frusto conical surface 42. As a result of the difference in angularity, initial contact between the tapered surface 48 and frusto conical surface 42 is made at the outer corner 50 of the frusto conical surface 42. Since this is the thinnest portion of the seal member 46, it is relatively easy for the edge 52 of the seal member to wipe against the cylindrical wall of the aperture 28 effecting a seal with the wall. In order for the seal member 46 to establish a seal with the stem and the wall of the opening, an axial load is applied to the seal member 46 forcing it into initimate sealing contact with the frusto conical surface 42 of the annular shoulder 36 and at the same time wiping it radially outward into sealing contact with the wall of the aperture 28. See FIG. 2 which shows the relationship of the various parts upon application of the axial loading resulting from assembly. As mentioned, the angle of the tapered surface 48 is slightly greater than the angle of the frusto conical surface 42; therefore, initial contact between the tapered surface and frusto conical surface will be at the outer edge of each. Since the outer edge 52 of the seal member 46 is relatively thin, it will not take a large axial load to radially wipe the edge into sealing contact with the wall of the aperture 28. In order to apply an axial load to the seal member 46, a compression ring 54 is slipped over the outer cylindrical portion 37 of the stem 20 axially outward of the seal member 46. A bonnet cap 56 is placed over the stem on top of the compression ring 54. The bonnet cap 56 has two apertures 58—58 which align with threaded apertures 60—60 in the top of the boss 24. Threaded members 62—62 are threadedly engaged with the threaded apertures 62—62 and by tightening the threaded members 62—62 an axial load is transmitted to the seal member 46 through the bonnet cap 56 and compression ring 54. It has been found that a sufficient axial load is established by simply tightening the threaded members 62—62 snugly; for example, a 2″ valve using ⅜″ threaded members 75 inch pounds is ample. If desired other conventional packing box means of applying a load to the seal member 46 may be utilized as is well known in the art.

While the seal member 46 is slightly deformed under compressive load to establish an initial seal (see FIG. 3), it is not necessary for such load to be of sufficient magnitude to seal under all flow conditions as the seal will be pressure actuated. The pressure of the lading in the valve will act on the stem and move it axially outward moving the frusto conical surface 42 into sufficient intimate contact with the tapered surface 48 of the seal member 46 to assure a complete seal throughout the working pressure range of the valve. See FIG. 4 which shows the relationship of the parts when the valve is under pressure. In order that the material forming the seal member 46 will not cold flow into the clearance between the shoulder 36 and the cylindrical wall of the aperture 28 or around the compression ring 54, the cross-sectional area of the seal member 46 is sufficient to sustain the pressure exerted by the lading. Since the initial seal is at the edge 50 of the frusto conical surface 42 of the shoulder 36, the largest available area is presented for pressure actuation. Accordingly, the compressive load on the seal member 46 only has to be sufficient to assure an initial seal and snug up the respective members. This load will not be of such magnitude as to cause the seal member 46 to bind the rotation of the stem or excessively increase the turning torque of the valve.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim:

1. A stem seal for a valve comprising a valve housing having a valve chamber, a valve member in said valve chamber, a boss on the housing, an opening in said boss formed of a small aperture communicating with the valve chamber and a large aperture extending from the small aperture to the outer end of the boss and defining a planar support surface, a stem having a cylindrical inner end extending through the small aperture into the valve chamber with the end thereof being in co-operative engagement with the valve member, the stem having a shoulder located in the larger aperture and a cylindrical outer end extending out of the outer end of the boss, the shoulder having a frusto conical axial outer surface and flat axial inner surface, a flat resilient washer under the flat surface and in engagement with the support surface, an annular resilient seal member positioned over the cylindrical outer end of the stem and having a tapered surface opposing the frusto conical surface of the shoulder, the angle of the tapered surface being slightly greater than the angle of the frusto conical surface with respect to the axis of said stem so that said surfaces diverge outwardly toward the outer end of said stem whereby initial contact between the tapered surface and frusto conical surface will be made at the outer peripheral edge, annular means contacting the annular resilient seal member to apply an axial load on the resilient seal member whereby as a result the edge of the tapered surface of the seal member will be forced into initimate sealing contact with the edge of the frusto conical surface and will also wipe out and sealing engage the wall of the aperture.

2. A stem seal for a valve comprising a valve housing having a valve chamber, a valve member in said valve chamber, a boss on the housing, an opening in said boss formed of a small aperture communicating with the valve chamber and a larger aperture extending from the small aperture to the outer end of the boss and defining a generally planar stem thrust support surface, a stem having a cylindrical inner end, a shoulder and a cylindrical outer end, the cylindrical inner end extending through the small aperture into the valve chamber with the end thereof being in co-operative engagement with the valve member, the shoulder located in the larger aperture and the cylindrical outer end extending out of the outer end of the boss, the shoulder having a frusto conical axial outer surface and flat axial inner surface, a flat resilient washer under the flat surface and in intimate contact with said support surface, an annular resilient seal member positioned about the cylindrical outer end of the end of the stem and having an internal tapered surface thereon opposing the frusto conical surface of the shoulder, the angle of the tapered surface being slightly greater than the angle of the frusto conical surface with respect to the axis of said stem so that said surfaces diverge outwardly toward the outer end of said stem, a relatively rigid annular compression ring contacting the annular resilient seal member and applying in axial load on the resilient seal member, the load applied being of sufficient magnitude to cause the outer edge of the tapered surface of the seal member to intimately engage the outer edge of the frusto conical surface of the stem in sealing engagement and also to radially expand the external peripheral surface of said seal member to cause the seal member to tightly engage the wall of the larger aperture in sealing contact without being of such force as to cause binding of the stem, said stem adapted to be moved slightly in a direction outwardly of the valve by fluid pressure within the valve to increase the sealing pressure between the tapered surface and the frusto-conical surface and between the external peripheral surface of the seal member and the wall of the larger aperture in proportion to the fluid pressure within the valve.

3. A stem seal for a valve comprising a valve housing having a valve chamber, a valve member in said valve chamber, a boss on the housing, an opening in said boss formed of a small aperture communicating with the valve chamber and a larger aperture extending from the small aperture to the outer end of the boss and defining a generally planar support surface, a stem having a cylindrical inner end, a shoulder and a cylindrical outer end, the cylindrical inner end extending through the small aperture into the valve chamber with the end thereof being in co-operative engagement with the valve member, the shoulder located in the larger aperture and the cylindrical outer end extending out of the outer end of the boss, the shoulder having a frusto conical axial outer surface and flat axial inner surface, a flat resilient washer under the flat surface and in intimate contact with said support surface, an annular resilient seal member positioned over the cylindrical outer end of the end of the stem and having a tapered surface opposing the frusto conical surface of the shoulder, the angle of the tapered surface being slightly greater than the angle of the frusto conical surface with respect to the axis of said stem so that said surfaces diverge outwardly toward the outer end of said stem, annular means contacting the annular resilient seal member to establish an initial seal, thereafter pressure in the valve acting on the stem to cause a pressure actuated stem seal which will be proportionate to the pressure in the valve.

4. A stem seal for a valve comprising a valve housing having a valve chamber, a valve member in said valve chamber, a boss on the housing, an opening in said boss formed of a small aperture communicating with the valve chamber and a larger aperture extending from the small aperture to the outer end of the boss and defining a generally planar support surface, a stem having a cylindrical inner end, a shoulder and a cylindrical outer end, the cylindrical inner end extending through the small aperture into the valve chamber with the end thereof being in co-operative engagement with the valve member, the shoulder located in the larger aperture and the cylindrical outer end extending out of the larger aperture, the shoulder having a frusto conical axial outer surface and flat axial inner surface, a flat resilient washer under the flat surface and in intimate contact with said support surface, an annular resilient seal member positioned over the cylindrical outer end of the end of the stem and having a tapered surface of a slightly greater angle with respect to the axis of said stem than the angle of said frusto-conical surface so that said surfaces diverge outwardly toward the outer end of said stem, said tapered surface opposing the frusto conical surface of the shoulder, annular means contacting the annular resilient seal member to establish an initial seal, thereafter pressure in the valve acting on the stem to cause a pressure actuated stem seal which will be proportionate to the pressure in the valve.

5. A stem seal for a valve comprising a valve housing having a valve chamber, a valve member in said valve chamber, a boss on the housing, an opening in said boss formed of a small aperture communicating with the valve chamber and a larger aperture extending from the small aperture to the outer end of the boss and defining a generally planar support surface, a stem having a cylindrical inner end extending through the small aperture into the valve chamber with the end thereof being in co-operative engagement with the valve member, the stem having a shoulder located in the larger aperture, the shoulder having a frusto conical axial outer surface and being in intimate engagement with said support surface, an annular resilient seal member having a tapered surface opposing the frusto conical surface of the shoulder, the angle of the tapered surface being slightly greater than the angle of the frusto conical surface with respect to the axis of said stem so that said surfaces diverge outwardly toward the outer end of said stem whereby initial contact will be made at the outer edge, annular means maintaining contact on the annular resilient seal member to apply an axial load on the resilient seal member forcing the seal member into sealing engagement with the tapered surface of the shoulder and wall of the aperture.

References Cited by the Examiner
UNITED STATES PATENTS

| | | | |
|---|---|---|---|
| 849,837 | 4/07 | Eggleston | 251—214 XR |
| 1,548,018 | 8/25 | Angell | 251—214 |
| 1,625,698 | 4/27 | Barton | 277—112 |
| 2,247,031 | 6/41 | Norton | 277—110 |
| 2,817,545 | 12/57 | Uhler | 251—214 XR |
| 2,861,773 | 11/58 | Clade | 251—315 |
| 2,989,209 | 6/61 | Hersman | 277—170 XR |

ISADOR WEIL, *Primary Examiner.*

M. CARY NELSON, *Examiner.*